(12) United States Patent
Harris

(10) Patent No.: US 8,825,119 B2
(45) Date of Patent: *Sep. 2, 2014

(54) PORTABLE TELEPHONE WITH CONNECTION INDICATOR

(71) Applicant: Scott C. Harris, Rancho Sante Fe, CA (US)

(72) Inventor: Scott C. Harris, Rancho Sante Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,585

(22) Filed: Dec. 17, 2012

(65) Prior Publication Data

US 2013/0109445 A1    May 2, 2013

Related U.S. Application Data

(63) Continuation of application No. 12/340,573, filed on Dec. 19, 2008, now Pat. No. 8,335,546.

(51) Int. Cl.
*H04M 1/00* (2006.01)

(52) U.S. Cl.
USPC ...... 455/573; 455/550.1; 455/572; 455/556.1

(58) Field of Classification Search
USPC .............. 455/41.2–41.3, 66.1, 67.11, 79, 88, 455/127.1, 128, 343.1–343.3, 344, 455/348–349, 412.2, 550.1, 556.1–556.2, 455/566, 569.1, 557–558, 572–573, 575.1, 455/410–411, 418–420, 346, 507, 552.1, 455/575.7–575.8; 320/134, 136, 138–149, 320/151–152, 165, DIG. 12, DIG. 18; 340/12.5–12.55, 13.24–13.27

See application file for complete search history.

(56) References Cited

U.S. PATENT DOCUMENTS

| | | | |
|---|---|---|---|
| 5,903,135 A | 5/1999 | Posses et al. | |
| 6,255,800 B1 | 7/2001 | Bork | |
| 6,978,119 B2 | 12/2005 | Chen | |
| 7,065,658 B1 | 6/2006 | Baraban et al. | |
| 7,190,312 B2 * | 3/2007 | Holmes et al. | 343/702 |
| 7,313,364 B2 | 12/2007 | Morimoto | |
| 7,458,518 B2 | 12/2008 | Fukuda et al. | |
| 2004/0203490 A1 | 10/2004 | Kaplan | |
| 2005/0079820 A1* | 4/2005 | Yamashita | 455/41.2 |
| 2005/0093708 A1 | 5/2005 | Dupeire | |
| 2006/0025074 A1 | 2/2006 | Liang et al. | |
| 2006/0111053 A1* | 5/2006 | Wu et al. | 455/90.3 |
| 2007/0167194 A1 | 7/2007 | Brown et al. | |
| 2007/0202807 A1 | 8/2007 | Kim | |
| 2007/0202934 A1* | 8/2007 | Kim | 455/575.3 |

(Continued)

OTHER PUBLICATIONS

"LG Premieres World's First Phone With Built in Bluetooth Headset," Jun. 2008.

*Primary Examiner* — Meless Zewdu

(74) *Attorney, Agent, or Firm* — Law Office of Scott C. Harris, Inc.

(57) ABSTRACT

A slave device is charged directly from a cellular phone. The slave device can be charged along with the cellular phone or from the internal battery of the cellular phone. When the slave device is connected, a "click" sound is played through an enunciator of the cellular phone.

11 Claims, 2 Drawing Sheets

(56) References Cited

U.S. PATENT DOCUMENTS

| | | |
|---|---|---|
| 2008/0194203 A1 | 8/2008 | Hong |
| 2008/0224659 A1 | 9/2008 | Singh |
| 2008/0242229 A1 | 10/2008 | Sharma |
| 2008/0263451 A1 | 10/2008 | Portele et al. |
| 2009/0017881 A1* | 1/2009 | Madrigal .................. 455/575.1 |
| 2009/0061926 A1* | 3/2009 | Lee ............................. 455/556.1 |
| 2009/0163247 A1* | 6/2009 | Song ............................. 455/566 |
| 2009/0275308 A1* | 11/2009 | Valdez et al. ................. 455/405 |

\* cited by examiner

PORTABLE TELEPHONE WITH CONNECTION INDICATOR

CROSS-REFERENCE OF RELATED APPLICATION

This application is a continuation application of U.S. Ser. No. 12/340,573 filed Dec. 19, 2008, now U.S. Pat. No. 8,335,546 filed Dec. 18, 2012 and entitled "Portable Telephone With Connection Indicator," the disclosure of which is herewith incorporated by reference in its entirety.

BACKGROUND

Portable telephones are often used with auxiliary devices such as Bluetooth devices. Certain ordinances may require users use a hands-free device when operating a cell phone in the vehicle, for example. A problem, however, is that this requires that the user remember to bring two things into their vehicle: the phone and the handset. Forget either one, and you cannot make a call. Also, both of these units are driven from batteries. Both need to be charged. A typical way of doing this has been to charge the two devices separately. Either 2 chargers are necessary, or you charge one unit, then the other unit.

The LG decoy has a built-in Bluetooth handset that stores inside the phone, and allows charging the attached Bluetooth device at the same time as the phone.

SUMMARY

The present application describes improvements in a cellular phone of a type that controls connection to an external device, e.g, that houses an integrated hands-free device.

An embodiment describes a special device that produces an audible indication when a slave device, e.g., the Bluetooth headset device, is attached. The device also communicates with the handset, and also causes an audible communication when the handset device becomes low on charge.

Another embodiment may carry out similar operations when other devices are attached or communicating.

BRIEF DESCRIPTION OF THE DRAWINGS

These and other aspects will now be described in detail with reference to the accompanying drawings, wherein.

DETAILED DESCRIPTION

Figure 1A:
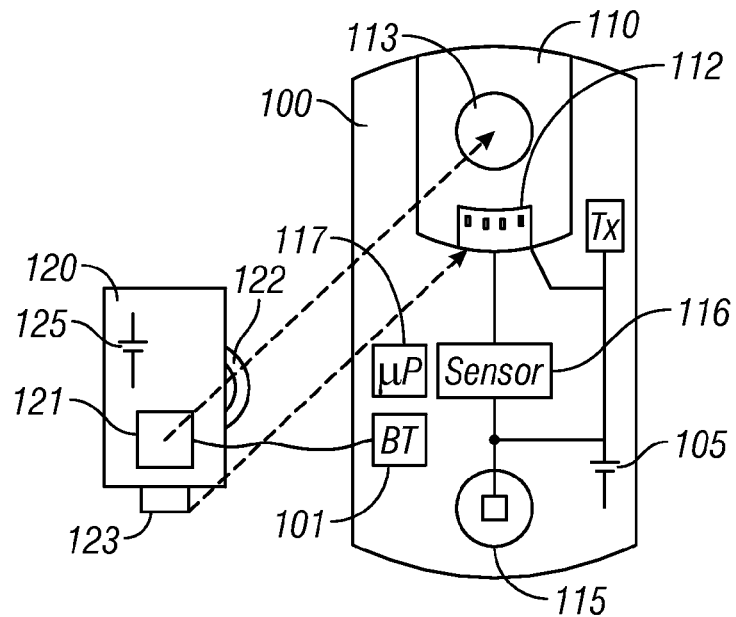
FIG. 1A shows a basic embodiment of a cellular phone where the slave is a Bluetooth device, and where an separate device creates a special sound when the device is attached.

FIG. 1A shows an embodiment. A master device, here a cellular phone device 100 includes a slave device 120 that communicates and is connectable therewith. In this embodiment, the slave device 120 is a Bluetooth wireless headset which is used for communicating via the cellular phone. Other embodiments may include other slave devices, e.g., RFID devices, wifi devices, and/or others.

A Bluetooth module 101 in the cellular phone device communicates with a corresponding Bluetooth module 121 in the Bluetooth device 120. The cellular telephone runs from a battery 105. In a similar way, the Bluetooth device 120 runs from power from a battery 125. Both batteries must be charged.

In this embodiment, the Bluetooth device 120 can be inserted into a corresponding area 110 within the main cellular phone. The earpiece 122 of the Bluetooth device can be connected into an earpiece receiving area 113 within the area 110. A connector 123 on the Bluetooth device 120 can connect to a corresponding connector 112 within the area 110. The connector 123 can provide both power and communication, allowing the slave battery—here Bluetooth battery 125 to be charged commonly with the cell phone. The slave battery 125 can be charged from either the charging source for the cellular phone or from the battery 105 within the cellular phone or battery. The slave battery connects to a battery connection, and charges through that battery connection.

The phone also includes a communicator device that allows communicating over a channel. The communicator device is powered from the battery 105.

The Bluetooth communication may carry out housekeeping functions such as determining status of the different devices. The Bluetooth communication can also carry out communication between the devices so that the user can use the Bluetooth device as a hands-free unit to talk over the cell phone.

The cellular phone also includes an enunciator shown as 115 which may be a ringer and/or the speaker which is otherwise used for a speakerphone.

A sensor 116 may sense when the Bluetooth device 120 is connected to the connector 112 and drawing power therefrom. In this embodiment, when the Bluetooth is properly connected, the detection of the connection between master and slave causes playback of an electronic file indicative of a clicking sound in one embodiment. The connection that is connected can be a charging connection, or a communication connection. When the connection is established, especially the charging connection, a "click" sound may be played. The click may be for example, the sound of a pen cap clicking on to the pen.

The file may be a compressed or uncompressed sound file, e.g., a way or MP3 file, for example.

The file may represent some other sound. However, the clicking sound may be preferred in one embodiment, since it provides audio feedback that sounds like the sound that would be made when snapping a device into place. In the embodiment, however, the slave device is placed on the connector, and held without any kind of snap-action connection. Once held in place, the slave device is connected to the contacts, and charged by that connection. When the electrical connection is detected, the "click" sound is played through the enunciator of the phone. The connection makes a click sound, even though the device is not physically snapped into place. This provides feedback informing the user to inform them that they have properly electrically connected the slave unit into place. The electrical connection, which is not a snap connection, is enunciated as a snapping sound based on an electronic-based sound.

More generally, the sound which is played is a feedback sound for a proper electrical connection between the master and the slave. However, the sound represents a mechanical, not electrical action. This electronically-produced sound system provides feedback that the connectors are properly aligned and that the slave (Bluetooth) device is charging.

An advantage of such a device is that it does not require snap action devices but still provides an adequate feedback of the connection. When users do not have sufficient feedback about whether devices like this have been properly inserted, they will often press too hard on the device to press it into place. This over-inserts the device and possibly causes damage from pressing the device too hard.

Figure 1B:
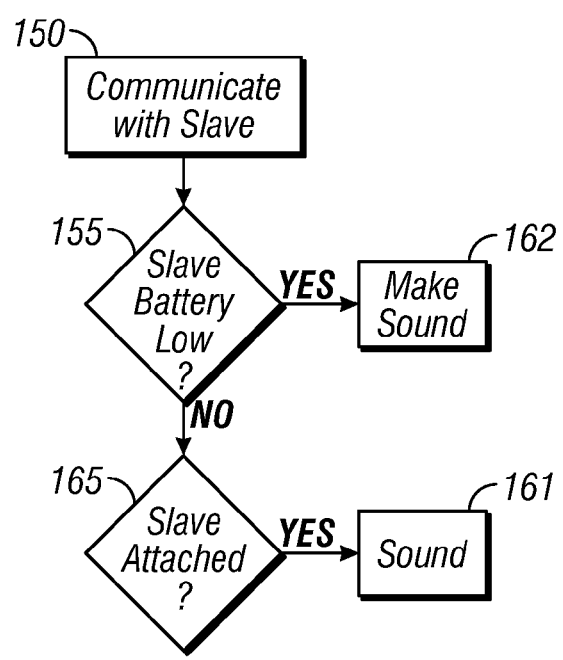
FIG. 1B shows a flowchart of operation carried out by a processor in the master device, e.g., cellular phone device and or communication controller.

The system may operate as shown in the flowchart of FIG. 1B, where the flowchart of FIG. 1B can be carried out by a processor such as 117 within the portable phone. The processor can be the telephone processor, a digital signal processor, or any other kind of processor that can carry out these operations.

At 150, the operation begins by the phone communicating with the slave, where the slave can be the Bluetooth unit. At 155, the phone queries the slave to detect the condition of the slave's battery. If the slave battery is too low, then the phone enunciator may play a sound at 160, for example a series of clicks, or another sound that may indicate that the battery is low.

If the slave battery is not low at 155, 165 detects whether the slave is attached. The detection of the slave may use the sensor 116 to detect current flow to the slave. At the moment the slave is attached, a sound is played at 161. The sound may be a click that has the same characteristics of snapping a device into place, e.g., the sound of a pen cap going on the end of a pen.

The above has described certain sounds that can be played during this operation. However, it should be understood that other sounds can be played. The sound can also be selectable, for example can be downloaded sounds, ring tones, or any sound of any type. The user might play a sound says "your battery is low" but preferably plays an audio sound that the user can get used to.

Also in this embodiment, the sound is played through the enunciator 115. However it should be understood that the sound can alternately be played through the earpiece 122 of the Bluetooth unit. In one embodiment, the sound may be played simultaneously through multiple speakers, e.g. the Bluetooth speaker 122 at the same time as being played through the enunciator 115. These two sounds may be played out of time and/or phase with one another to make a better sound effect of the item clicking into place.

Figure 2:
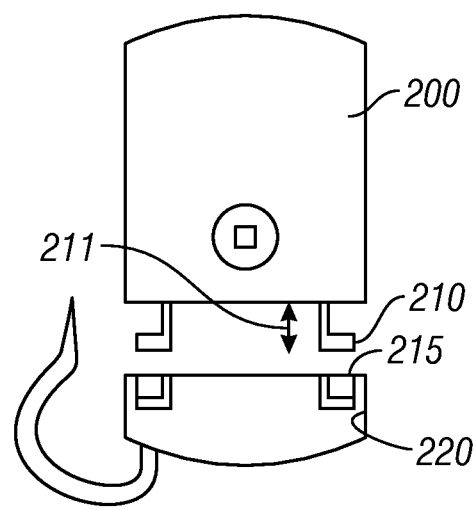
FIG. 2 shows a cellular phone with an alternative connection for a Bluetooth device.

FIG. 2 shows an alternative embodiment, in which the master (phone) 200 includes clips 210 on a bottom surface thereof. Those clips 210 clip into corresponding receiving portions 215 within a slave (wireless receiver such as a Bluetooth) unit 220. The clips may also have electrical contacts therein, which may also charge the receiver 220. Alternately, the electrical contacts can be separate from the clips. The embodiment of FIG. 2 may otherwise operate in the same way as the embodiment of FIG. 1A. The clips may be hook shaped and the slave slides on to the hooks in a way that maintains the position of the clips on those hooks. Alternately, the clips 210 may be movable, as shown by the arrow 211. In an embodiment, once the Bluetooth slave is attached onto the clips 210, the clips can be moved in a direction to hold the Bluetooth device more tightly, e.g., to retract based on an electrical force. The Bluetooth device can be removed, for example, by pressing a button to release the clips.

Figure 3:
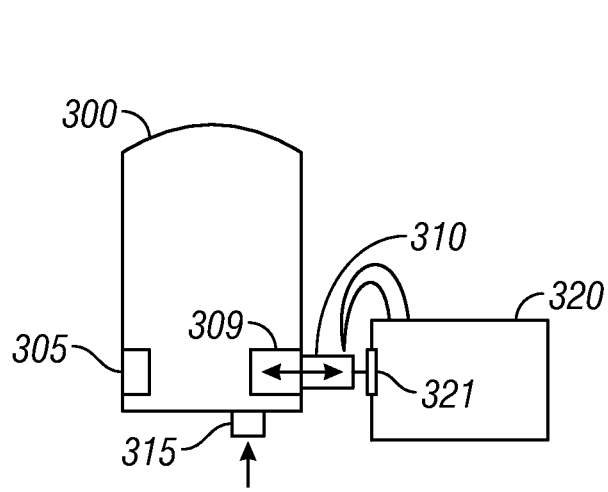
FIG. 3 shows yet another alternative for connecting with a Bluetooth device which includes an extendable and retractable connector of the type used for charging.

FIG. 3 shows an alternative embodiment in which the connector usually used for charging is used for its mechanical structure, to hold the slave onto the phone. In this embodiment, the phone 300 may include a charging port 305 which may be a mini USB port. In addition, however, the phone 305 may include a retractable male mini USB port connector 310. The connector 310 may be extended or retracted into position 309. The extension or retraction can use a sliding lever, or a button shown as 315. The sliding lever may use similar techniques to those used in USB drives to slide out the USB connector. The USB connector, once slid out, may be rigidly held in the outward position. In this embodiment, that connector is used to hold a Bluetooth device 320 of the type that is normally charged through a mini USB connector.

The extended USB connector 310 mates into the mini USB connector port 321. This holds the Bluetooth device into place on the phone.

While FIG. 3 shows this connector on an edge surface of the phone, this can be on any surface of the phone, and can be indented into the phone to allow easier carrying of the Bluetooth device.

In this embodiment, the Bluetooth device can communicate and charge as in the other embodiments.

Figure 4:
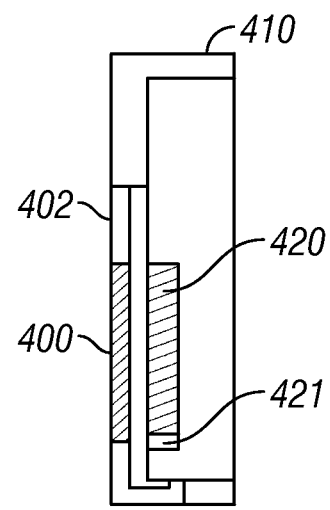
FIG. 4 shows another embodiment in which the slave device is an RFID device.

FIG. 4 shows an alternative embodiment in which the slave is an active RFID chip/assembly 400. Active RFID chips can carry out various operations including transmitting and receiving information. However, these RFID chips are often limited by their battery capacity. While the RFID chips use very low power, the battery size and form factor is limited by the packaging of the RFID device. In this embodiment, the RFID assembly may be in a flat adhesive package as conventional. The adhesive is attached to a battery door 402 of a cellular phone 410. The cellular phone 410 also includes a battery 420. In the embodiment, the RFID chip 400 has extending contacts that connect directly to the battery terminals 421 and is powered directly from those terminals when the battery door is in place. This allows the cellular phone to use the RFID chip as a slave in this embodiment. The RFID battery may be rechargeable so that it may be used even when the battery door is not in place or when the battery is discharged.

As in the above embodiments, the presence of the RFID device may cause the enunciator to make a "click" sound. For example, when the RFID device is brought on line, or when it is interrogated or carries out some action, the enunciator may "click".

The RFID slave may be used for many different functions, including inventory, e.g., to determine which phones are in stock. It can be used for taking attendance, e.g., to determine which people are in a room or in a class. It can be used to allow networking. It can also be used for other purposes.

The battery within the RFID chip may be rechargeable and may recharge directly from the battery 420 of the cellular phone and/or may be recharged when the main battery of the phone is recharged. This may contradict the usual paradigm where the capacity of the RFID chip must be limited so that its normal functions can operate from the battery of the RFID chip for the life of the chip. This system allows recharging that chip, and thereby allows the RFID chip to carry out more functions.

Another embodiment plays the sound, e.g., the "click" when the RFID chip carries out some function, e.g, when it is queried, or when it responds, or when its battery level becomes too low.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way.

This disclosure is intended to be exemplary, and the claims are intended to cover any modification or alternative which might be predictable to a person having ordinary skill in the art. For example, kinds of slaves other than Bluetooth and RFID can be mated with the phone.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The master devices described herein may be any kind of computer, either general purpose, or some specific purpose computer such as a workstation. The computer may be a special purpose computer such as a PDA, cellphone, or laptop.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A telephone system comprising:
   a cellular phone, having a cellular communicator;
   a power connection for receiving an external electrical power,
   a connection for an internal battery, where the external electrical power from the power connection charges the internal battery, and the internal battery also powers the cellular phone;
   the cellular phone having a battery door, that can be connected to the cellular phone to cover the battery, and can be removed from the cellular phone to expose the battery;
   an RFID device that is attached to the battery door of the cellular phone and where the RFID device wirelessly communicates;
   the cellular communicator which allows communicating over a channel, the communicator powered from the battery connection;
   wherein the RFID device receives power from the cellular phone battery when the battery door is connected to the cellular phone to cover the battery, wherein the RFID device has contacts that extend from the battery door to the cellular phone to receive the power.

2. The telephone system as in claim 1, further comprising an enunciator on the cellular phone, that makes sounds associated with use of the RFID device that is attached to the battery door.

3. The telephone system as in claim 1, wherein the RFID device is charged by the power from the cellular phone.

4. The telephone system as in claim 1, wherein the RFID device communicates separately from the communicating carried out by the cellular phone.

5. The telephone system as in claim 2, wherein the enunciator also makes sounds associated with use of a second device, different than said RFID device, and said second device is associated with and in communication with the cellular phone, wherein the sounds for the second device indicates that the second device is connected to the cellular telephone.

6. The telephone system as in claim 5, wherein the second device is a Bluetooth communicating device.

7. The telephone system as in claim 1, where the RFID device wirelessly connects with the cellular phone.

8. A method of operating a telephone system comprising:
   powering a cellular phone using a battery, where the powering comprises allowing the cellular phone to carry out multiple functions including communicating over a cellular network and interfacing with a user interface of the cellular phone;
   covering the battery using a battery door, where the battery door is configured to be removed to expose the battery;
   attaching an RFID device to the battery door, and where the RFID device wirelessly communicates separately from the communicating over the network of the cellular phone,
   wherein the RFID device receives power from the cellular phone when the battery door is attached to the cellular phone to cover the battery, wherein the RFID device has contacts that extend from the battery door to the cellular phone and further comprising receiving the power over the contacts.

9. The method as in claim 8, further comprising using an enunciator on the cellular phone, to make sounds associated with use of the RFID device that is attached to the battery door.

10. The method as in claim 9, wherein the enunciator makes sounds indicating that a second device other than the RFID device is connected to the cellular phone.

11. A telephone system comprising:
    a cellular phone, having a cellular communicator;
    a connection for an internal battery, where the internal battery also powers the cellular phone and powers the cellular communicator and also powers a user interface of the cellular phone;
    the cellular communicator which allows communicating over a first channel, the communicator powered from the battery connection;
    an RFID device that is attached to a housing of the cellular phone and where the RFID device wirelessly communicates over a separate channel than the first channel over which the cellular communicator communicates;
    the cellular telephone also including a Bluetooth communicator, that communicates via Bluetooth to an external device;
    the cellular telephone also including an enunciator on the cellular phone, that makes sounds associated with use of the RFID device and also makes sounds associated with use of the Bluetooth communicator, wherein the sounds for the Bluetooth communicator include sounds indicating that the Bluetooth communicator is connected to the cellular telephone,
    wherein the cellular phone housing having a battery door, that is configured to be connected to the cellular phone to cover the battery, and is configured to be removed from the cellular phone to expose the battery , the RFID device is connected to the battery door, and wherein the RFID device receives power from the cellular phone when the battery door is attached to the cellular phone to cover the battery, and wherein the RFID device has contacts that extend from the battery door to the cellular phone to receive the power.

* * * * *